(12) United States Patent
Klotz

(10) Patent No.: US 8,783,172 B2
(45) Date of Patent: Jul. 22, 2014

(54) DEVICE FOR MINCING FOOD

(75) Inventor: Markus Klotz, Hainau (DE)

(73) Assignee: Leifheit AG, Nassau/Lahn (DE)

( * ) Notice: Subject to any disclaimer, the term of this patent is extended or adjusted under 35 U.S.C. 154(b) by 354 days.

(21) Appl. No.: 12/570,514

(22) Filed: Sep. 30, 2009

(65) Prior Publication Data

US 2010/0107903 A1    May 6, 2010

(30) Foreign Application Priority Data

Oct. 30, 2008   (DE) .................. 10 2008 053 926

(51) Int. Cl.
*A47J 23/00* (2006.01)

(52) U.S. Cl.
USPC .............................................. 99/538; 99/537

(58) Field of Classification Search
USPC ........... 99/501, 511, 513, 537, 538, 485, 486, 99/489, 348, 352, 353, 354, 355; 241/95, 241/92, 65, 73, 23, 66, 33, 172, 277, 219; 83/663, 932, 592, 356.3, 856, 719, 83/729, 406.1
See application file for complete search history.

(56) References Cited

U.S. PATENT DOCUMENTS

| | | | | |
|---|---|---|---|---|
| 5,013,230 A | * | 5/1991 | Ikeuchi et al. | ................ 425/127 |
| RE35,789 E | * | 5/1998 | Amstad | ............................ 99/625 |
| 5,947,016 A | * | 9/1999 | Repac et al. | ..................... 99/538 |
| 2007/0262182 A1 | * | 11/2007 | de Groote et al. | ......... 241/169.1 |

FOREIGN PATENT DOCUMENTS

DE      20117358 U1    2/2002

* cited by examiner

*Primary Examiner* — Henry Yuen
*Assistant Examiner* — Phuong Nguyen
(74) *Attorney, Agent, or Firm* — Leydig, Voit & Mayer, Ltd.

(57) ABSTRACT

A device for mincing food includes at least one cutting blade or grater and a feed device. Food to be minced is feedable through the feed device to the at least one cutting blade or grater. The feed device includes parallel first and second mutually opposing inner walls.

13 Claims, 3 Drawing Sheets

DEVICE FOR MINCING FOOD

CROSS REFERENCE TO RELATED APPLICATIONS

Priority is claimed to German patent application DE 10 2008 053 926.0, filed Oct. 30, 2008, which is hereby incorporated by reference herein.

FIELD

The present invention relates to a device for mincing food having at least one cutting blade or at least one grater and having a feed device through which food to be minced is feedable to the cutting blade or, as the case may be, to the grater.

BACKGROUND

A device for mincing food, which has a feed device for feeding the material to be cut or grated to a cutting or grating device, is described in German Utility Model Patent DE 201 17 358 U1. The feed device of this and other such devices for mincing food, in particular, those which are manufactured in injection molding processes, have a conical design, the cone angle typically being only a few degrees. The reason for this is that, otherwise, the feed device would not be readily demoldable during the fabrication process, particularly during injection molding. Another reason is that ease of insertion and removability of the pusher should be ensured. The cone angle is typically so small (approximately 2-3 degrees) that the user does not detect this optically. However, for reasons not evident to the user, it is disadvantageous that the material to be minced often jams when it only just fits into or is even larger than the filling opening and had been pressed into the same by the user.

SUMMARY

An aspect of the present invention is to provide a device for mincing food which will make it possible to prevent the material to be cut from jamming in the feeder device.

In an embodiment, the present invention provides a device for mincing food having at least one cutting blade or grater and a feed device. Food to be minced is feedable through the feed device to the at least one cutting blade or grater. The feed device includes parallel first and second mutually opposing inner walls.

BRIEF DESCRIPTION OF THE DRAWINGS

An exemplary embodiment of the present invention is described in more detail below and shown schematically in the drawings, in which.

DETAILED DESCRIPTION

Figure 1:
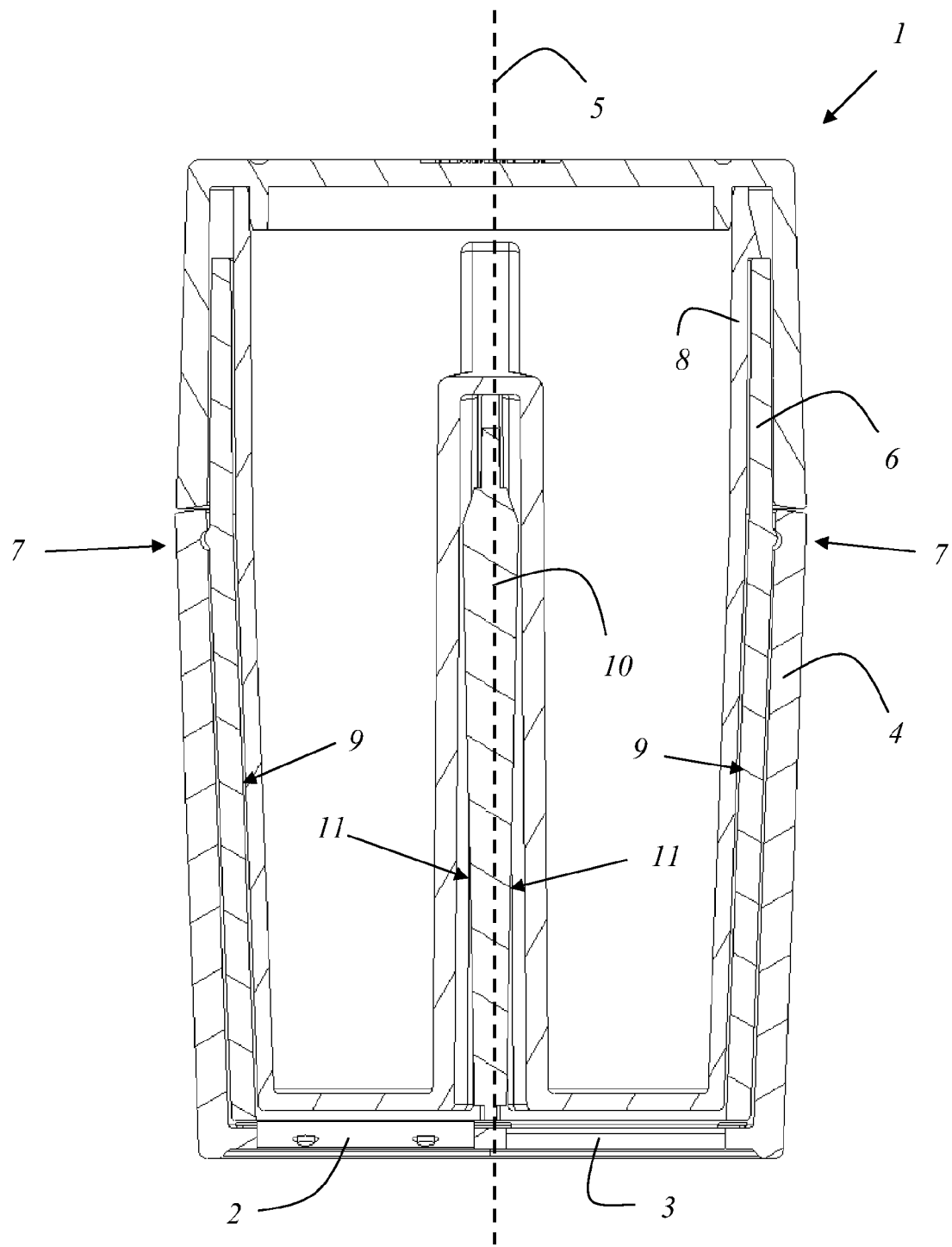
FIG. 1 is a sectional drawing of a device for mincing food according to the present invention.

It was discovered in accordance with the present invention that the conicity of the feed device, through which the food product to be minced is feedable to the cutting blade or, as the case may be, to the grater, that is optically not at all discernible and is mostly inherent to the manufacturing process, is responsible for the jamming, in particular, of rigid material to be cut, such as hard cheese or garlic. The approach whereby the inner walls of the feed device are configured in parallel to one another, seems surprisingly simple once the preconceived notion shared by experts in the field that conicity is absolutely necessary, is theoretically overcome. This holds, in particular, because a feed device of this kind may be fabricated in one piece in the injection molding process, as is described in greater detail in the following.

One embodiment of the device for mincing food in accordance with the present invention provides that the inner cross section of the feed device be annular in design. The annular cross section may be obtained, for example, by using spaced-apart cones and/or conical sections to form the inner volume of the feed device. It may also be provided that the inner volume of the feed device have a conical inner bounding wall at the perimeter and that a conical core, whose outer surface is disposed in parallel to the conical inner bounding wall, be configured in the feed device. In particular, when working with devices for mincing food where the feed device is rotated over the cutting blade or, as the case may be, the grater, these specific embodiments have the advantage that the region of the cutting blade or of the grater, through which the axis of rotation extends, is covered by the core, so that no material to be cut reaches that region; also, since virtually no relative movement would occur in this region between the cutting blade or, as the case may be, the grater and the material to be minced, no cutting or grating action occurs in this region. It is a realization of the present invention that an especially simple functioning may be made possible by the particular embodiment of the device for feeding foodstuff when the material to be minced is conveyed exclusively to those cutting blade or grater regions where the material to be minced is also actually subject to a cutting or grating action due to the rotary motion.

It may be provided for the feed device to be movably—in particular rotationally—mounted relative to the cutting blade, or rather to the grater. Particularly in the specific embodiments which provide for the feed device of the device for mincing food to be rotationally mounted about its own central axis, it may be advantageous for a driving element to be provided within the feed device to transfer the rotary motion of the feed device to the material to be minced. This driving element may be designed as a separating wall or as an indentation or a bulge.

One particular specific embodiment of the device for mincing food according to the present invention provides for the cutting blade or, as the case may be, the grater to be configured at the bottom of a beaker. Additionally, it may be provided for the feed device to be rotationally mounted within the beaker, it being possible, in particular, to provide that the feed device be easily removable from the beaker, especially to facilitate cleaning of the device. A re-releasable detent device may be provided, for example, for rotationally fixing the feed device within the beaker.

One particular specific embodiment provides that, on the inside, the beaker have a conical design, in particular, to facilitate removal of the feed device. In this connection, it is advantageous that the feed device have the same conicity on the outside that the beaker has on the inside.

To be able to push the material to be minced through the feed device, a pusher may be provided that is introducible into the feed device.

As already mentioned, the feed device of the device for mincing food according to the present invention may be fabricated cost effectively and in relatively large quantities, preferably in one piece, in injection-molding processes. To facilitate removal from the injection mold, the present invention provides that the mold form of the injection mold that shapes the interior space of the feed device have a multipart—at least two-part—design. For example, it may be provided that the mold of the injection mold that shapes the interior space of the feed device be composed of inversely movable parts that are at least partially conical. The conical parts may preferably be joined together in such a way that the mutually opposing outer surfaces of the assembled parts are disposed in parallel to one another, so that, in the final analysis, these outer surfaces make it possible to produce the mutually parallel inner surfaces of the injection-molded part, namely of the feed device.

The device for mincing food according to an embodiment of the present invention is able to be used for rigid and hard foodstuffs, such as nuts, garlic and the like, and it may also be specially designed as a garlic cutter.

FIG. 1 shows a device for mincing food 1 according to an embodiment of the present invention having a first cutting blade 2 and a second cutting blade 3 which are configured radially at the bottom of a beaker 4. A feed device 6 that is rotationally mounted about an axis of rotation 5 is configured in beaker 4, this feed device being held with the aid of a re-releasable detent device 7 that is composed of a peripheral groove configured in the beaker and a bead configured on the outer periphery of feed device 6. A pusher 8, which, in the top region, also engages on the exterior of feed device 6 at the top end thereof, is introducible into feed device 6. Feed device 6 features a driving element that is designed as a separating wall and is disposed perpendicularly to the cutting direction and is, therefore, not shown. Pusher 8 is slit in such a way that it engages over the separating wall, so that, in response to rotation of pusher 8, feed device 6 is simultaneously corotated; accordingly, pusher 8 transmits a torque to the feed device. To fill in the material to be minced, pusher 8 is pulled out of feed device 6, thereby allowing the material to be minced to be subsequently filled in from above. Feed device 6 has a conical inner bounding wall 9 at the perimeter. Moreover, a conical core 10, whose outer surface 11 is disposed in parallel to the conical inner bounding wall 9, is configured in feed device 6.

Figure 2:
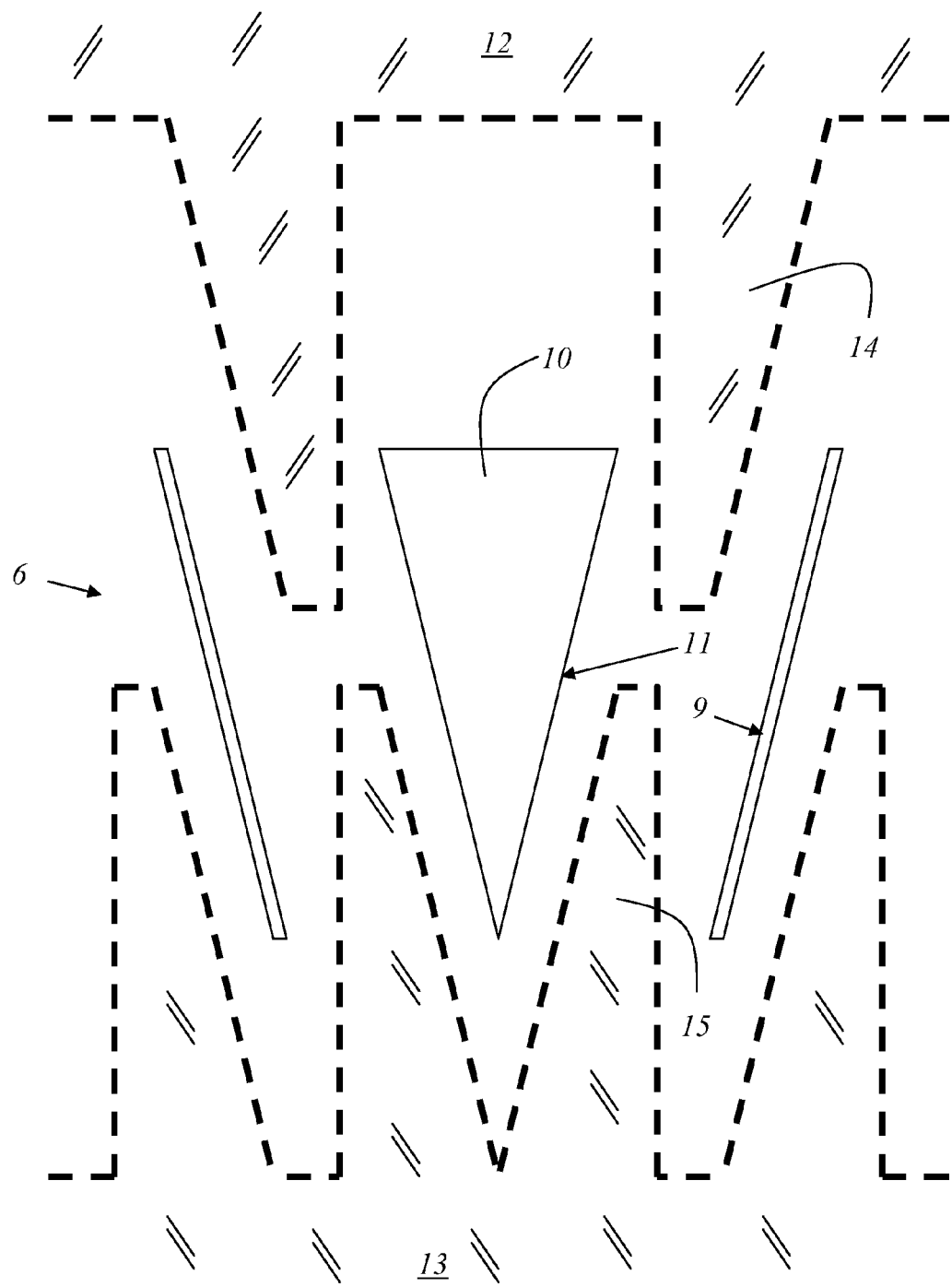
FIG. 2 schematically shows the manufacturing of a feed device in an injection-molding process, given an open injection mold.
Figure 3:
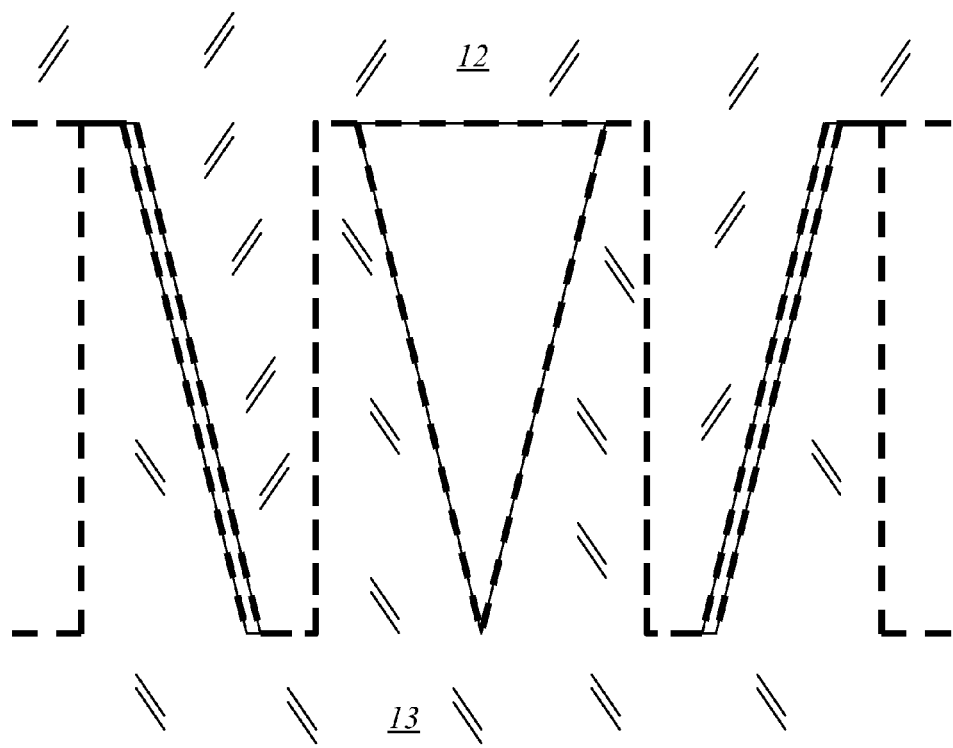
FIG. 3 shows the manufacturing of the feed device given a closed injection mold.

FIG. 2 shows schematically how feed device 6—whose conicity is exaggerated in this figure—together with core 10 may be produced in one piece in the injection molding process without any demolding problems arising. The injection mold has a two-part design and is composed of a first mold part 12 and a second mold part 13. The inner surfaces forming the interior space of feed device 6, namely conical inner bounding wall 9 and outer surface 11 of core 10, are formed by the cooperation of individual conical molded parts 14, 15, which, in the case of a closed injection mold, mutually position themselves in such a way that altogether parallel surfaces are obtained which render possible the injection of mutually parallel, conical inner bounding wall 9 and outer surface 11 of core 10. This is shown in FIG. 3.

The present invention has been described with reference to a specific embodiment. However, it is self-evident that changes and modifications thereto may be made without departing from the protective scope of the claims set forth in the following.

LIST OF REFERENCE NUMERALS 1 device for mincing food
2 cutting blade
3 cutting blade
4 beaker
5 axis of rotation
6 feed device
7 detent device
8 pusher
9 inner bounding wall
10 core
11 outer surface
12 mold part
13 mold part
14 individual conical molded part
15 individual conical molded part

I claim:

1. A device for mincing food comprising:
a beaker including at least one cutting blade or grater disposed at a bottom of the beaker; and
a feed device through which food to be minced is feedable to the at least one cutting blade or grater, the feed device being rotatable disposed in the beaker and including a perimeter with a conical inner bounding wall and a core disposed within the perimeter that has a conical outer surface disposed in parallel to the conical inner bounding wall of the perimeter;
wherein an inner volume of the feed device is formed by at least one of cones and conical sections disposed in a spaced-apart relation; and
wherein the feed device is injection molded in a mold having inversely movable, conical parts.

2. The device for mincing food as recited in claim 1, wherein the feed device includes an annular cross section.

3. The device for mincing food as recited in claim 1, wherein the feed device is movably disposed relative to the at least one cutting blade or grater.

4. The device for mincing food as recited in claim 1, wherein the feed device is rotatable with respect to the at least one cutting blade or grater.

5. The device for mincing food as recited in claim 1, further comprising a driving element disposed in the feed device.

6. The device for mincing food as recited in claim 5, wherein the driving element includes a separating wall.

7. The device for mincing food as recited in claim 1, further comprising a releasable detent device configured to fix the feed device within the beaker and allow rotation therebetween.

8. The device for mincing food as recited in claim 1, wherein the beaker includes a conical design such that the feed device is removable therefrom.

9. The device for mincing food as recited in claim 1, wherein a conicity of an outer surface of the feed device is the same as a conicity as an inner surface of the beaker.

10. The device for mincing food as recited in claim 1, further comprising a pusher removably disposable in the feed device and configured to push the food to be minced through the feed device.

11. The device for mincing food as recited in claim 1, wherein the feed device is injection molded in a mold having a two-part design.

12. The device for mincing food as recited in claim 1, wherein the inversely movable, conical parts are joinable such that mutually opposing outer surfaces of the mold, when assembled, are parallel.

13. The device for mincing food as recited in claim 1, wherein the device is configured to cut garlic.

* * * * *